United States Patent [19]

Carlgren et al.

[11] 4,456,973
[45] Jun. 26, 1984

[54] AUTOMATIC TEXT GRADE LEVEL ANALYZER FOR A TEXT PROCESSING SYSTEM

[75] Inventors: Richard G. Carlgren, Gaithersburg; Walter S. Rosenbaum, Bethesda; Alan R. Tannenbaum, Washington Grove, all of Md.

[73] Assignee: International Business Machines Corporation, Armonk, N.Y.

[21] Appl. No.: 373,544

[22] Filed: Apr. 30, 1982

[51] Int. Cl.³ .............................................. G06F 15/21
[52] U.S. Cl. ...................................... 364/900; 364/300
[58] Field of Search ................. 364/200 MS File, 300

[56] References Cited

U.S. PATENT DOCUMENTS 4,270,182 5/1981 Asija ..................................... 364/900

Primary Examiner—Raulfe B. Zache
Attorney, Agent, or Firm—John W. Henderson, Jr.

[57] ABSTRACT

A system for proofreading a text document and automatically detecting and replacing text words in the document which exceed a predetermined understandability level for the documents intended audience. Text words and synonyms are stored in a dictionary which includes an understandability code for each word based statistically on textbook grade levels. The operator enters a grade level code into the system for the intended document audience. The system scans the document for words which exceed the desired grade level, highlights those words on the system display and prompts the operator with synonyms which can be used to replace the highlighted word. The operator may select a desired replacement synonym by placing the system cursor underneath the word and depressing and enter key from the system keyboard.

15 Claims, 6 Drawing Figures

```
1         2         3         4         5         6         7
8901234567890123456789012345678901234567890123456789012345678901234567890123456789
  COMMAND:                                GRADE LEVEL   5
``` abandon                      abashed

```
vb   leave                    adj   ashamed
     quit                           embarrassed
     desert                         shamefaced
     give up                        humiliated
     surrender
```

MESSAGE:

FIG. 5

AUTOMATIC TEXT GRADE LEVEL ANALYZER FOR A TEXT PROCESSING SYSTEM

DESCRIPTION

1. Technical Field

This invention relates to text processing systems and more particularly to methods in text processing systems for automatically analyzing the grade level of a text document.

2. Background Art

The development trend in the text processing system industry is to produce as many useful functions as possible in text processing systems to aid support personnel and principals in document preparation and to reduce the required repetitive tedious work. However, little, if any, of the development work has been directed to the reader or consumer of the text processing system output. Some effort has been made in the area of reviewing documents for sentence readability by studying sentence length, word length and number of punctuations. By formulating criteria based on these factors to which the text of a document can be compared, the author is given an assessment of the relative sentence structure lucidity. This does not address the word content of the document nor does it consider the capability of the document audience.

DISCLOSURE OF INVENTION

It has been discovered that improved text proofing for the purpose of reviewing word content against educational level of the intended audience can be achieved by coupling a specialized dictionary of words including grade level data to a text processing system for automated text review and recomposition to meet a desired grade level. The system includes means for setting a desired maximum grade level for a composition and reviewing the text of the composition against the grade level dictionary. The text words that exceed the set grade level are highlighted on the system display screen and a set of synonyms offered as substitutes for the highlighted word. The system operator can select a desired one of the synonyms for the highlighted word for automatic insertion into the composition, replacing the highlighted word.

BRIEF DESCRIPTION OF DRAWINGS

FIG. 5 illustrates the presentation of text on the display screen of FIG. 4 in accordance with the present invention.

BEST MODE FOR CARRYING OUT THE INVENTION

Figure 1:
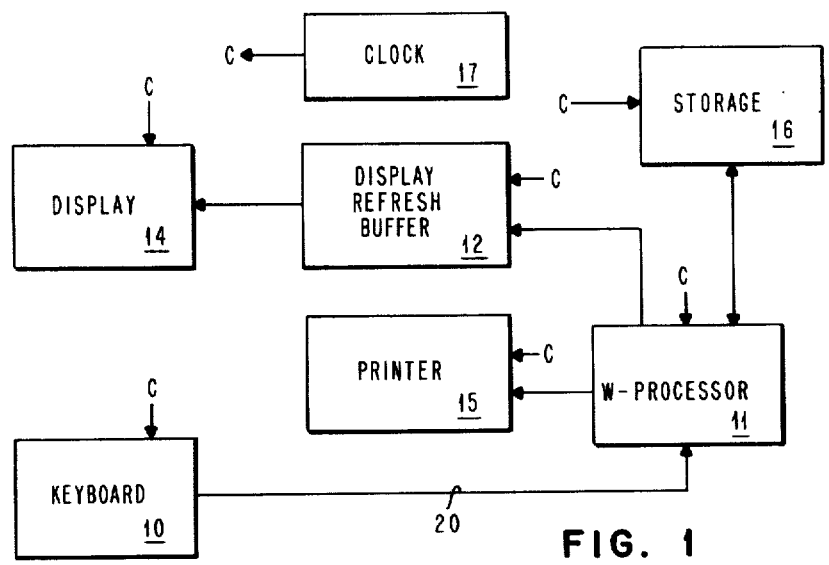
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary direct access storage device 16 such as a disk or diskette drive. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys including carriage return, tab, index, etc. In addition, the keyboard 10 includes a second set of control keys for issuing special control commands to the system. The control keys include cursor movement keys, keys for setting the keyboard 10 into a number of different modes, etc.

Figure 2:
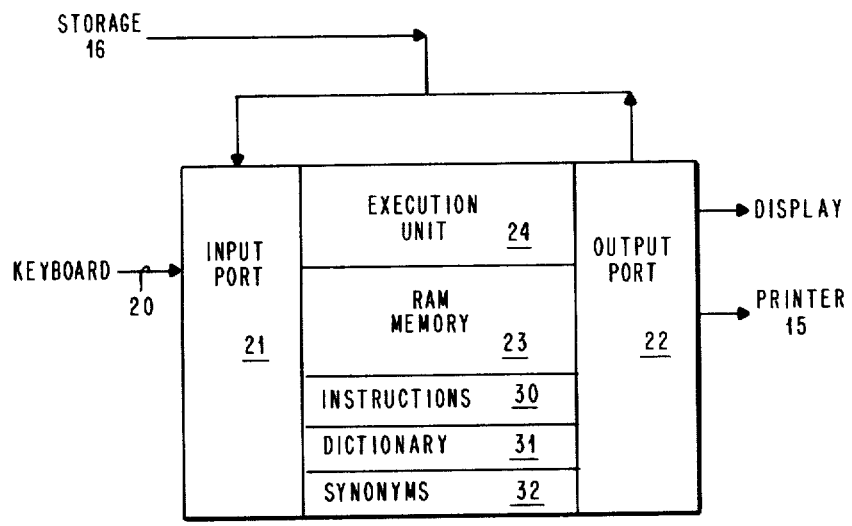
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
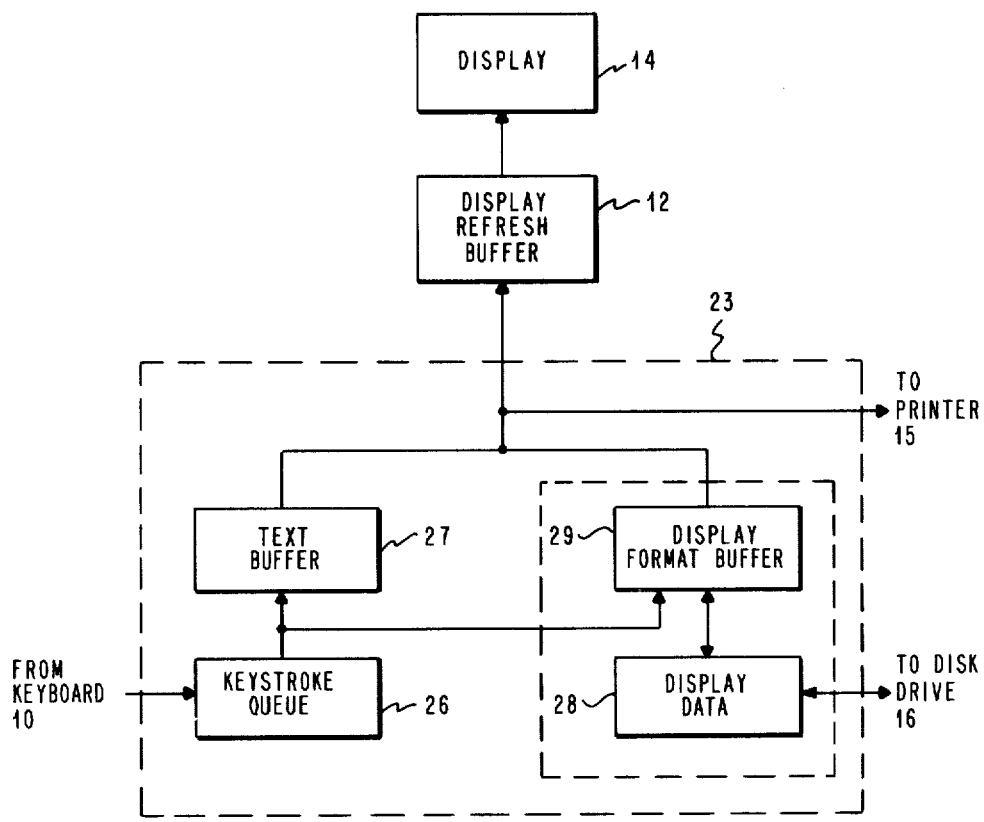
FIG. 3 is a functional diagram illustrating the data flow path between portions of the memory and the microprocessor and the display refresh buffer.

Functionally, memory unit 23 stores both instructions and data in specified sections which will be described in more detail later in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball element or a daisy-wheel print element.

Disk storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. Another section of memory 23 shown in FIG. 3 is the display format buffer area 29 which is involved in the handling of spatially related data in decoded form in accordance with the method of the present invention.

Figure 4:
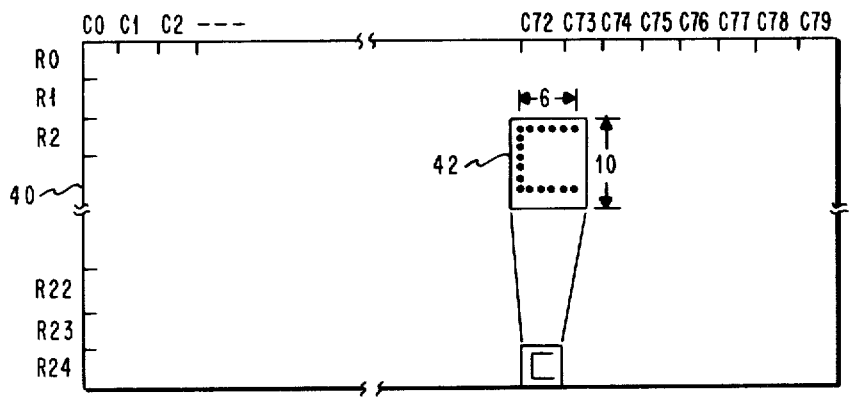
FIG. 4 is a diagrammatic view of the display shown in FIG. 1.

FIG. 4 is a schematic representative of the screen 40 of display device 14. As shown in FIG. 4, the screen 40 has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 42 in FIG. 4. The interaction of the refresh buffer 12 and the display 14 is to convert the characters stored at a location in the buffer 12 to the corresponding character as formed in a 6×10 dot matrix at the equivalent location on the display screen 40. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs and data which are also stored in memory 23 shown as memory blocks 30, 31, and 32 of FIG. 2 and which are called into operation in response to data from the keyboard 10 or interrupt signals generated by the various components of the system shown in FIG. 1.

The preferred embodiment of the present invention comprises a set of instructions or programs for controlling the text processing system of FIG. 1 for reviewing the text data on the display screen 40 against the entries in a dictionary list stored in memory 31. The entries in the dictionary memory 31 include text words and an appended code indicating the grade level of the text words. The text words in the dictionary also include appended codes which point to synonyms for the text words in the memory 32. The synonyms are stored and accessed in accordance with the encoding disclosed in co-pending application Ser. No. 218,222, entitled "Binary Vocabulary Matrix Automatic Thesaurus", filed Dec. 19, 1980, by W. S. Rosenbaum, et al, and assigned to the same assignee as the present application and incorporated herein by reference. It is understood that no distinction need be made between dictionary words and synonyms. For example, all words can be stored together and include an appended grade level code and an appended synonym code which points to other synonyms for the word.

The grade level codes assigned to the text words in the dictionary list may be based either on the extensive testing of students or by the analysis of required text books by grade to determine at what grade level a given word has been sufficiently introduced into a student's lexicon to assume that it is known. There are several publications available which also provide grade level information. One such publication is "The Living Word Vocabulary, A National Vocabulary Inventory" by Edgar Dale and Joseph O'Rourke, World Book-Child Craft International, Inc., copyright 1981. This publication provides a list of words in a format similar to that shown in Table 1. The "score" column indicates a statistical percentage of students at a given grade level who will recognize the word in question and know its meaning. In setting up a grade level dictionary list, the score percentage required to place a word in a particular grade level may be arbitrarily set. Applicants have recognized that generally a score of 67% is sufficient when placing a word in a grade level category.

TABLE 1

| GRADE | SCORE | WORD — WORD MEANING |
|---|---|---|
| 04 | 79% | a — one, any |
| 08 | 72% | A — musical note |
| 16 | 37% | aardvark — animal |
| 12 | 65% | ab — away, off, from |
| 12 | 51% | A.B. — bachelor of arts |
| 16 | 40% | abaca — herb plant |
| 10 | 76% | abacus — counting frame |
| 16 | 30% | abaft — toward the rear |
| 16 | 57% | abalone — large snail |
| 06 | 76% | abandon — freedom from restraint |
| 06 | 74% | abandon — give up |
| 12 | 72% | abandon — reckless enthusiasm |
| 06 | 89% | abandoned — deserted |
| 16 | 75% | abase — degrade |
| 16 | 61% | abasement — humiliation |
| 12 | 55% | abash — embarrass |
| 12 | 71% | abashed — ashamed |
| 12 | 69% | abate — diminish |
| 12 | 41% | abated — grew less |
| 16 | 62% | abatement — decrease |
| 16 | 40% | abattoir — slaughter house |
| 16 | 31% | abba — father |
| 12 | 34% | abbacy — friar's office |
| 16 | 22% | abbe — religious person |
| 12 | 34% | abbess — head of a convent |
| 08 | 78% | abbey — home of nuns or priests |
| 12 | 65% | abbey — group of monks |
| 10 | 89% | abbot — high church officer |
| 04 | 74% | abbreviate — shorten |
| 04 | 69% | abbreviation — shortened form |
| 04 | 67% | abbreviation — short form of a word |
| 04 | 93% | ABC's — the alphabet |
| 10 | 79% | abdicate — forsake the throne |
| 12 | 85% | abdicate — give up rights |
| 12 | 41% | abdication — forsaking the throne |
| 16 | 68% | abdication — giving up a right |
| 06 | 77% | abdomen — where stomach is |
| 06 | 67% | abdominal — about the stomach |
| 10 | 77% | abduct — kidnap |
| 10 | 72% | abduction — kidnapping |
| 13 | 81% | abduction — pulling from normal position |
| 16 | 47% | abeam — toward ship's side |
| 16 | 27% | abecedarian — learner of ABC's |
| 12 | 78% | abed — at rest |
| 12 | 60% | abegging — neglected |
| 13 | 42% | aberrant — departing from the normal |
| 16 | 48% | aberration — not normal |
| 16 | 03% | abert — western squirrel |
| 13 | 68% | abet — assist |
| 13 | 64% | abettor — accomplice |

Referring now to FIG. 5, there is shown an example of data on the screen 40 of the display 14. The display has highlighted the words "abandon" and "abashed" at the upper part of the screen. In operation, the grade level analyzer function may be invoked in a text processing system through a conventional "menu" task selection function such as disclosed in U.S. Pat. No. 4,308,582, issued Dec. 29, 1981 to David A. Berger and assigned to the International Business Machines Corp. and incorporated herein by reference.

During the menu task selection function, the text processing system displays to the operator a menu of functions that the system can perform. The operator may then select one or a combination of such functions through operation of cursor control and select or enter keybuttons on the system keyboard 10. For example, functions to paginate, check spelling, hyphenate for formatting, and analyze the grade level of text words in a document can be invoked singularly or in any combination. As an alternative to menu selection, the text processing system could be provided with a separate keybutton to invoke each of the functions that the system is capable of performing.

During the menu setup procedure, the system prompts the operator to enter a number representing the grade level to which the input document is to compared. In the example shown in FIG. 5, the grade level 5 is shown at 42 on the command line 41 of the display 40. The two words "abandon" and "abashed" are merely shown as examples. In actual operation, a text document such as a letter, page of a text book, technical report, or other document would appear on the display screen 40. The grade level analyzer would then scan the document word-by-word comparing each word and the input grade level appearing on the command line to the contents of the grade level dictionary.

Figure 6:
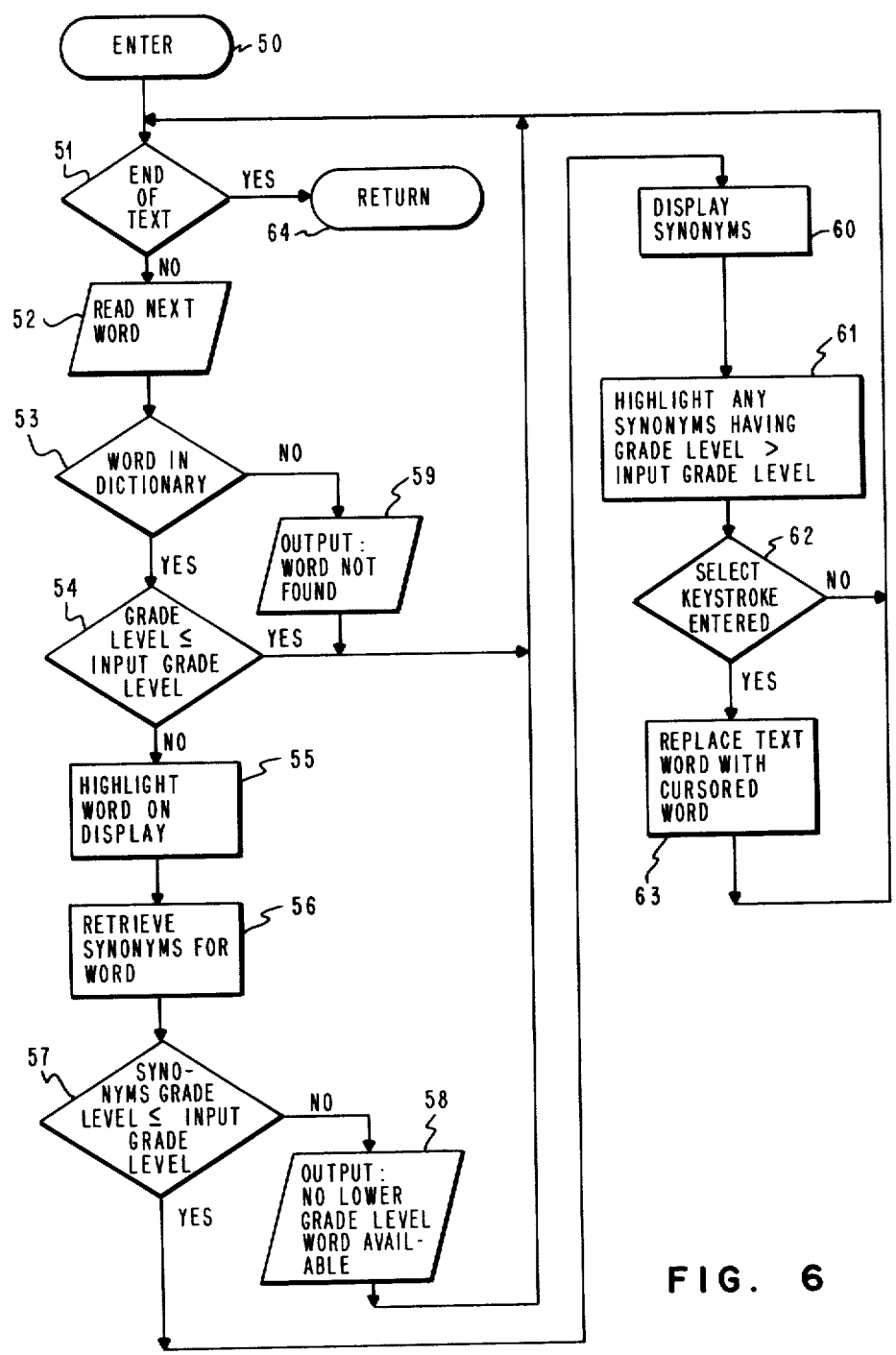
FIG. 6 is an operational flow diagram for controlling the text processing system to perform the function of the present invention.

FIG. 6 shows a flow diagram for the operation of the grade level analyzer of the present invention. The function is entered at block 50 and a test is performed to determine whether the end of test has been reached at block 51. If the end of text has not been reached, then at block 52 the next word of text is read and compared at block 53 to the contents of the grade level dictionary stored in dictionary memory 31. If the word is not found in the dictionary memory 31, then at block 59 the system is instructed to display a message on message line 45 indicating that the word was not found in the dictionary and processing returns to block 51 to continue reading text. If the word was found in the dictionary then at block 54 the grade level of the word in the dictionary is compared to the input grade level on the command line 5. When the grade level of the word does not exceed the input grade level then processing returns to block 51 to read the next word of text. However if the grade level of the word does exceed the input grade level then at block 55 the system is instructed to highlight the word on the display screen 40. In block 56 the grade level analyzer retrieves the synonyms for the word from the synonym dictionary 32 and displays the list of synonyms along with the part of speech of the word on the display screen underneath the word, for example, as shown in block 43. As previously stated, the synonyms are stored and accessed in accordance with the technique disclosed in co-pending application Ser. No. 218,222, entitled, "Binary Vocabulary Matrix Automatic Thesaurus", filed Dec. 19, 1980. The accessed synonyms are also scanned at block 57 to determine if their grade levels exceed the input grade level. If the grade level of all of the available synonyms exceed the input grade level then at block 58 the system displays a message on message line 45 indicating that no lower grade level word is available and processing returns to block 51. However, if synonyms are available whose grade level meets the input criteria, then all the synonyms are displayed and the synonyms whose grade level exceeds the input grade level are displayed in highlighted form. Alternatively, only those synonyms that do not exceed the input grade level could be displayed. The display of synonyms is executed at block 60 with the highlighting of synonyms occurring in block 61. The operator may then use the keyboard cursor control keys to position the display cursor underneath a synonym which is to be substituted for the highlighted word in the document. If this occurs, and a keystroke to enter the selected synonym is received at block 62, then at block 63 the highlighted text word is replaced with the cursored synonym and processing returns to block 51 to continue. After the last word of the text has been processed, the routine will return to the machine operation which was occurring when the routine was entered at block 64.

A program listing for the grade level analyzer routine is shown in Table 2 in pseudo code. The application and use of pseudo code is described in "An Introduction to Programming", (A Structural Approach Using PL/1 and PL/C-7) Second Edition, by Richard Conway and David Gries, Winthrop Publishers, Cambridge, Mass., copyright 1975.

TABLE 2

BEGINSEGMENT(GRDLVL)

ENTER GRDLVL;
SAVE THE ADDRESS OF CALLER;
IF ENTERED FOR INITIALIZATION, THEN
OBTAIN ACCESS TO STORAGE FILE FOR
DICTIONARY LIST;
OBTAIN ACCESS TO STORAGE FILE FOR
SYNONYMS LIST;
GET MAIN STORAGE SPACE FOR DICTIONARY LIST
AND RECORD ADDRESS IN SCRATCH PAD;
GET MAIN STORAGE SPACE FOR SYNONYMS LIST
AND RECORD ADDRESS IN SCRATCH PAD;
BUILD DICTIONARY LIST IN MAIN STORAGE;
BUILD SYNONYMS LIST IN MAIN STORAGE;
STORE GRADE LEVEL INPUT IN GLREG;
RELINQUISH ACCESS TO STORAGE FILE;
IF INITIALIZATION WAS NOT SUCCESSFUL, THEN
SET RETURN TO CALLER;
ENDIF;
ENDIF;
IF ENTERED TO CHECK GRADE LEVEL OF WORDS, THEN
DO UNTIL END OF DOCUMENT;
READ NEXT WORD;
IF WORD IS FOUND IN DICTIONARY LIST: THEN
IF GRADE LEVEL OF DICTIONARY WORD IS GREATER
THAN GLREG, THEN
HIGHLIGHT WORD ON DISPLAY;
RETRIEVE SYNONYMS FOR WORD;
IF GRADE LEVELS OF ALL SYNONYMS ARE
GREATER THAN GLREG, THEN
CALL MSGDSPLY
TO DISPLAY MESSAGE (NO LOWER
GRADE LEVEL WORD AVAILABLE)
ELSE
DISPLAY SYNONYMS
HIGHLIGHT ANY SYNONYMS HAVING
GRADE LEVEL GREATER THAN GLREG;
IF ENTER KEYSTROKE, THEN
REPLACE WORD WITH CURSORED SYNONYM;
ENDIF;
ENDIF;
ENDIF;
ELSE
CALL MSGDSPLY
TO DISPLAY MESSAGE (WORD NOT FOUND IN
DICTIONARY)
ENDIF;
ENDDO;
ENDIF;
RETURN
TO CALLER
ENDSEGMENT(GRDLVL)

While the invention has been particularly shown and described with reference to a best mode, it will be understood by those skilled in the art that various changes in form and detail may be made without departing from the spirit and scope of the invention.

We claim:

1. A method for detecting and correcting linguistic expressions which exceed a predetermined understandability level in a list of linguistic expressions using a programmable digital computer system comprising the steps of:
   (a) storing in a first section of the memory of said programmable digital computer system a dictionary of linguistic expressions including an understandability code for each linguistic expression;
   (b) storing in a second section of the memory of said programmable digital computer system a list of synonymic expressions for said dictionary of linguistic expressions including an understandability code for each synonymic expression;
   (c) storing a code representing a predetermined desired understandability level;
   (d) comparing each member of an input set of linguistic expressions to said dictionary of linguistic expressions;
   (e) comparing the understandability code of the dictionary linguistic expression which compares equal to the input member linguistic expression to the stored desired understandability level code;
   (f) highlighting the member of the input set of linguistic expressions when the understandability code of the dictionary linguistic expression is greater than the stored desired understandability level code;
   (g) displaying a set of synonymic expressions for the highlighted linguistic expression; and
   (h) replacing the highlighted linguistic expression with a member of the displayed set of synonymic expressions.

2. The method for detecting and correcting linguistic expressions of claim 1 wherein said step of displaying a set of synonymic expressions includes displaying in highlighted format any synonymic expressions whose understandability code exceeds the predetermined desired understandability code.

3. The method for detecting and correcting linguistic expressions of claim 1 or claim 2 wherein the step of displaying a set of synonymic expressions includes displaying an indication when no synonymic expression stored for the highlighted linguistic expression has an understandability code less than or equal to the predetermined desired understandability level.

4. The method for detecting and correcting linguistic expressions of claim 1 or claim 2 wherein the step of comparing each member of an input set of linguistic expressions to said dictionary includes displaying an indication when no equal compare occurs.

5. The method for detecting and correcting linguistic expressions of claim 1 or claim 2 wherein said step of highlighting includes displaying said linguistic expressions in boldface.

6. A system for detecting and correcting the understandability level of linguistic expressions in a set of linguistic expressions using an information processor comprising:
   means for storing a dictionary of linguistic expressions including an understandability code associated with each linguistic expression;
   means for storing a list of synonymic expressions for said dictionary of linguistic expressions including an understandability code associated with each synonymic expression;
   means for storing a code representing a predetermined understandability level;
   first compare means for comparing each member of an input set of linguistic expressions to said dictionary of linguistic expressions;
   second compare means responsive to said first compare means for comparing the understandability code of the dictionary linguistic expression which compares equal to the member of the input set of linguistic expressions to said code representing a predetermined understandability level;
   means for highlighting the member of the input set when the understandability code of the dictionary linguistic expression compares greater than the predetermined understandability level;
   means for displaying the set of synonymic expressions for the highlighted member of the input set of linguistic expressions; and
   means for replacing the highlighted linguistic expression with a member of the displayed set of synonymic expressions.

7. The system for detecting and correcting the understandability level of claim 6 wherein said means for displaying the set of synonymic expressions includes means for highlighting the synonymic expressions whose understandability code exceeds the code representing a predetermined understandability level.

8. The system for detecting and correcting the understandability level of claim 6 or claim 7 wherein said means for displaying the set of synonymic expressions includes means for displaying an indication when no synonymic expression stored for the highlighted linguistic expression has an understandability level less than or equal to the predetermined desired understandability level.

9. The system for detecting and correcting the understandability level of claim 6 or claim 7 wherein said first compare means includes means for displaying an indication when the input linguistic expression does not compare equal to one of the dictionary linguistic expressions.

10. The system for detecting and correcting the understandability level of claim 7 wherein said means for highlighting includes displaying said linguistic expressions in boldface.

11. The system for detecting and correcting the understandability level of claim 6 or claim 10 wherein said means for replacing the highlighted linguistic expression with a member of the displayed set of synonymic expressions includes a keyboard, and means in said keyboard for signalling said information processor to selectively replace the highlighted linguistic expression with a member of the displayed set of synonymic expressions.

12. A method for detecting and correcting linguistic expressions with exceed a predetermined understandability level in a list of linguistic expressions using a programmable digital computer system comprising the steps of:
   (a) storing in the memory of said programmable digital computer system a dictionary of linguistic expressions including an understandability code and a synonymic code associated with each linguistic expression;
   (b) storing a code representing a predetermined desired understandability level;
   (c) comparing each member of an input set of linguistic expressions to said dictionary of linguistic expressions;

(d) comparing the understandability code of the dictionary linguistic expression which compares equal to the input linguistic expression to the stored desired understandability level code;
(e) highlighting the member of the input set of linguistic expressions when the understandability code of the dictionary linguistic expression is greater than the stored desired understandability code;
(f) comparing the remainder of the dictionary linguistic expressions' synonymic codes to the synonymic code of the dictionary expression which matches the input linguistic expression;
(g) displaying each dictionary linguistic expression whose synonymic code matches the synonymic code of the dictionary linguistic expression equal to the input linguistic expressions; and
(h) replacing the highlighted linguistic expression with a member of the displayed set of synonymic expressions.

13. The method for detecting and correcting linguistic expressions of claim 12 wherein said step of displaying each dictionary linguistic expression whose synonymic code matches the synonymic code of the dictionary linguistic expression equal to the input linguistic expression includes displaying in highlighted format any dictionary linguistic expression whose understandability code exceeds the predetermined desired understandability code.

14. The method for detecting and correcting linguistic expressions of claim 12 or claim 13 wherein the step of displaying each dictionary linguistic expression whose synonymic code matches the synonymic code of the dictionary linguistic expression equal to the input linguistic expression further includes displaying an indication when no synonymic expression stored for the highlighted member of the input set of linguistic expressions has an understandability code less than or equal to the predetermined desired understandability level.

15. The method for detecting and correcting linguistic expressions of claim 12 or claim 13 wherein the step of comparing each member of an input set of linguistic expressions to said dictionary of linguistic expressions further includes displaying an indication when no equal compare occurs.

* * * * *

UNITED STATES PATENT AND TRADEMARK OFFICE
CERTIFICATE OF CORRECTION

PATENT NO. : 4,456,973
DATED : June 26, 1984
INVENTOR(S) : R. G. Carlgren, et al It is certified that error appears in the above—identified patent and that said Letters Patent is hereby corrected as shown below:

Column 8, line 55, "with" should read --which--.  (Claim 12)

Signed and Sealed this

Fourth Day of December 1984

[SEAL]

Attest:

GERALD J. MOSSINGHOFF

Attesting Officer

Commissioner of Patents and Trademarks